(12) United States Patent
Raju

(10) Patent No.: US 8,310,102 B2
(45) Date of Patent: Nov. 13, 2012

(54) SYSTEM AND METHOD FOR POWER CONVERSION

(75) Inventor: Ravisekhar Nadimpalli Raju, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 13/075,224

(22) Filed: Mar. 30, 2011

(65) Prior Publication Data

US 2011/0221195 A1    Sep. 15, 2011

(51) Int. Cl.
*H02J 1/00*    (2006.01)
*H02J 3/00*    (2006.01)

(52) U.S. Cl. .............. 307/82; 363/65; 363/71; 318/377; 318/759; 318/798; 318/807

(58) Field of Classification Search .......... None
See application file for complete search history.

(56) References Cited

U.S. PATENT DOCUMENTS

| 5,999,427 | A  | * | 12/1999 | Dahler et al. | ................... | 363/71 |
| 6,680,856 | B2 |   | 1/2004  | Schreiber |  |  |
| 7,532,490 | B2 |   | 5/2009  | Datta et al. |  |  |
| 7,679,941 | B2 |   | 3/2010  | Raju et al. |  |  |
| 2001/0036094 | A1 | * | 11/2001 | Strand et al. | ................... | 363/65 |
| 2009/0128278 | A1 | * | 5/2009  | Prinsloo et al. | ............... | 336/220 |
| 2011/0278938 | A1 | * | 11/2011 | McCleer | ........................ | 307/82 |

OTHER PUBLICATIONS

Y. Suresh, A.K. Panda; Performance of Cascade Multilevel H-Bridge Inverter with Single DC Source by Employing Low Frequency Three-Phase Transformers; This paper appears in: IECON 2010—36th Annual Conference on IEEE Industrial Electronics Society; Issue Date: Nov. 7-10, 2010; 6 Pages.

Fujin Deng, Zhe Chen; A New Structure Based on Cascaded Multi-level Converter for Variable Speed Wind Turbine; This paper appears in: IECON 2010—36th Annual Conference on IEEE Industrial Electronics Society; Issue Date: Nov. 7-10, 2010; pp. 3167-3172.

Siriya Skolthanarat, Virgilio Centeno; Grid Interconnection for Variable-speed Wind Farm with Multi-level Inverter; This paper appears in: Power and Energy Society General Meeting—Conversion and Delivery of Electrical Energy in the 21st Century, 2008 IEEE; Issue Date: Jul. 20-24, 2008; pp. 7 Pages.

* cited by examiner

*Primary Examiner* — Rexford N Barnie
*Assistant Examiner* — Justen Fauth
(74) *Attorney, Agent, or Firm* — Ann M. Agosti

(57) ABSTRACT

A multilevel inverter is provided. The multilevel inverter includes a plurality of bridges, each bridge configured to receive a respective portion of an input DC power and convert the respective portion to a respective converted AC power. The multilevel inverter also includes at least one bridge controller for operating at least one of the plurality of bridges in a square waveform mode. The multilevel inverter further includes a plurality of transformers, each transformer coupled to a respective bridge and configured to increase a voltage level of the respective portion of converted AC power. The plurality of transformers further includes secondary windings coupled in series with the other secondary windings to combine the respective increased voltage level portions of the converted AC power. The multilevel inverter also includes a grid converter configured to provide output power for a power grid.

15 Claims, 6 Drawing Sheets

SYSTEM AND METHOD FOR POWER CONVERSION

BACKGROUND

Embodiments of the present invention relate generally to a system for generating high voltage power in a fluid turbine.

Fluid turbines, such as wind turbines and marine hydrokinetic devices, generate electricity from kinetic energy of fluids such as wind and water that is transmitted to power grids for distribution. For example, a wind turbine typically includes a rotor component that converts the kinetic energy of the wind to mechanical energy and a synchronous generator that converts the mechanical energy to an alternating current (AC) power with varying frequency and a low voltage. The AC power generated by the synchronous generator is adjusted through a power conversion system before being transmitted to one ore more power grids for further distribution.

In one conventional power conversion system, the low voltage and varying frequency AC power is fed to an AC to DC converter disposed within the tower of the wind turbine via a low voltage cable. In a non-limiting example, the low voltage cable includes cables with an ability to transmit power having a voltage below 1000 volts. The AC to DC converter converts the varying frequency AC power to direct current (DC) power. The DC power is transmitted to an inverter via a DC link, and the inverter provides fixed frequency pulse width modulated AC power as an output. Furthermore, the fixed frequency pulse width modulated AC power is filtered to generate a sinusoidal fixed frequency AC power. The sinusoidal AC power is transferred to a step up transformer that converts the low voltage AC power to a high voltage AC power. Use of the inverters for pulse width modulation of the DC power in such embodiments may result in efficiency losses and further requires bulky and expensive filters to generate the sinusoidal AC power. Furthermore, the low voltage cables that are used to transfer low voltage AC power to the AC/DC converters are large, heavy, and expensive. In addition, the transformers are large and bulky. Furthermore, in embodiments wherein an offshore AC/DC converter is installed to collect the AC power from various wind turbines and convert the AC power to DC power suitable for long distance transmissions, extra costs are incurred.

Hence, there is a need for an improved and a less expensive system to address the aforementioned issues.

BRIEF DESCRIPTION

In one embodiment, a multilevel inverter is provided. The multilevel inverter includes a plurality of bridges, each bridge configured to receive a respective portion of an input DC power and convert the respective portion of the input DC power to a respective portion of converted AC power. The multilevel inverter also includes at least one bridge controller for operating at least one of the plurality of bridges in a square waveform mode. The multilevel inverter further includes a plurality of transformers, each transformer coupled to a respective bridge and configured to increase a voltage level of the respective portion of converted AC power of the respective bridge, wherein each of the plurality of transformers comprises a primary winding coupled to the respective bridge and a secondary winding paired with the primary winding and coupled in series with the other secondary windings to combine the respective increased voltage level portions of the converted AC power. The multilevel inverter also includes a grid converter electrically coupled to the series connected secondary windings of the plurality of transformers and configured to provide output power for a power grid.

In another embodiment, a power conversion system is provided. The system includes a power source. The system also includes a multilevel inverter. The multilevel inverter includes a plurality of bridges, each bridge configured to receive a respective portion of an input DC power and convert the respective portion of the input DC power to a respective portion of converted AC power. The multilevel inverter also includes at least one bridge controller for operating at least one of the plurality of bridges in a square waveform mode. The multilevel inverter further includes a plurality of transformers, each transformer coupled to a respective bridge and configured to increase a voltage level of the respective portion of converted AC power of the respective bridge, wherein each of the plurality of transformers comprises a primary winding coupled to the respective bridge and a secondary winding paired with the primary winding and coupled in series with the other secondary windings to combine the respective increased voltage level portions of the converted AC power. The multilevel inverter also includes a grid converter electrically coupled to the series connected secondary windings of the plurality of transformers and configured to provide output power for a power grid.

In yet another embodiment, a method for power conversion is provided. The method includes splitting an input DC power into a plurality of portions of the input DC power. The method also includes converting each respective portion of the input DC power to a respective portion of converted AC power, wherein at least some of the portions of the input DC power are converted using a square waveform mode. The method further includes increasing the voltages of the respective portions of converted AC power. The method also includes combining the increased voltages in series to provide a combined AC power. The method further includes converting the combined AC power to provide output power for a power grid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
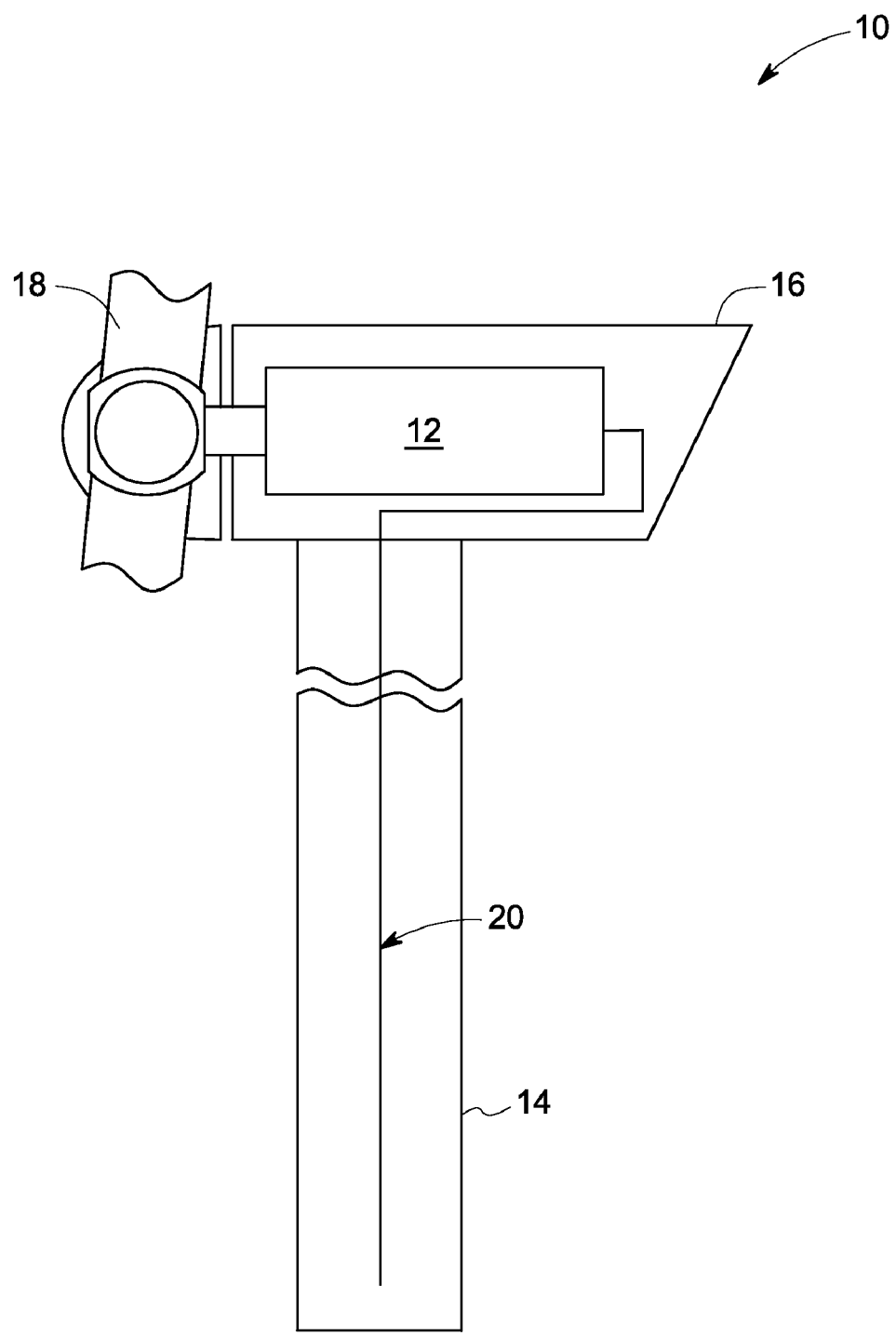
FIG. 1 is a partial schematic representation of a wind turbine system including a power conversion system in accordance with an embodiment of the invention.

Embodiments of the present invention include a multilevel inverter. The multilevel inverter includes a plurality of bridges wherein each bridge receives a respective portion of an input DC power and converts the respective portion to a respective converted AC power. The multilevel inverter also includes at least one bridge controller that controls the operation of at least one of the plurality of bridges in a square waveform mode. The multilevel inverter further includes a plurality of transformers wherein each of the plurality of transformers includes a primary winding that is electrically coupled to a respective bridge. The primary winding is paired with a secondary winding that is electrically coupled in series with the other secondary windings. The primary winding receives the respective portion of the converted AC power and transfers the same to the secondary winding resulting in an increase in a voltage level of the respective portion of the converted AC power. The respective portions of the converted AC power are combined by the series connected secondary windings to form a combined AC power. The combined AC power is transferred to a grid converter electrically coupled to the series connected secondary windings and provides output power for a power grid. As used herein, the terms "a" and "an" do not denote a limitation of quantity, but rather denote the presence of at least one of the referenced item, and the term "coupled" or "coupling" includes any suitable type of coupling and also includes both direct coupling and indirect coupling. Although single line drawings are used for purposes of example, each of the electrical lines in the drawing typically represents two or three physical lines/cables depending upon the context.

FIG. 1 is a partial schematic representation of a power source shown for purposes of example as a wind turbine system 10 including a power conversion system 12 in accordance with an embodiment of the invention. The wind turbine system 10 includes a tower 14, a nacelle 16 attached on top of the tower 14 and a rotor 18 mechanically coupled to the nacelle 16. The nacelle 16 includes the power conversion system 12 disposed within the nacelle 16 of the wind turbine system 10. The power conversion system 12 receives the mechanical energy from the rotor 18 and converts the mechanical energy to an output power suitable for transmission in a power grid via a high voltage cable 20. For off shore wind applications, for example, it will often be desirable to have DC output power with two cables 20 (one positive and the other negative). For some applications, the output power will comprise multiphase power with a cable 20 present for each phase.

Figure 2:
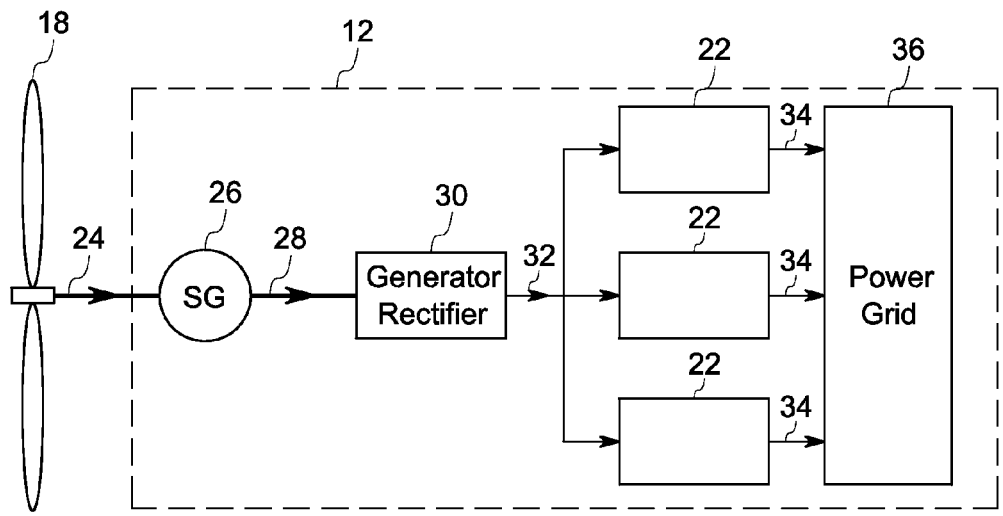
FIG. 2 is a block diagram representation of a power conversion system depicting a plurality of multilevel inverters coupled to each phase of a multiphase power conversion system in accordance with an embodiment of the invention.

FIG. 2 is a block diagram representation of the power conversion system 12 depicting a plurality of multilevel inverters 22 each coupled to a respective phase of a multiphase power conversion system 12 in accordance with an embodiment of the invention. Three phases are shown in FIG. 2 for purposes of example, but other numbers of phases may be used. For example, in embodiments wherein the output power comprises DC output power or single-phase output power, a single multilevel inverter 22 may be used. The rotor 18 transfers the mechanical power 24 to the power conversion system 12. The power conversion system 12 includes, in the wind turbine example, a generator 26 that receives the mechanical power 24 and converts the mechanical power 24 to source power, which is shown as source power 28. The source power 28 is transferred to a generator rectifier 30 coupled to the generator 26. The generator rectifier 30 converts the source power 28 to an input DC power 32. In embodiments such as wind turbine embodiments, wherein the power source comprises an AC power source, the generator rectifier may comprise an AC-to-DC type rectifier. In embodiments wherein the power source comprises a DC power source, such as solar power generation embodiments, the generator rectifier may comprise a DC-to-DC type rectifier or may not be required.

In one embodiment, the input DC power 32 is then transferred to at least one multilevel inverter 22. Each multilevel inverter 22 receives a respective portion of the input DC power 32 and generates an output power 34 for a power grid 36 of the respective phase of the multilevel inverter. In one embodiment, the output power 34 is a high voltage power that is transmitted to the power grid 36 using high voltage cables 20 (FIG. 1).

Figure 3:
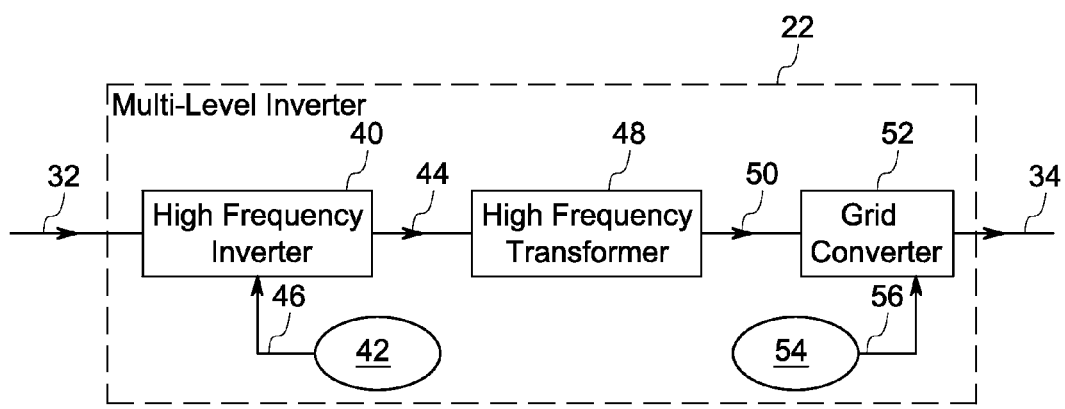
FIG. 3 is a block diagram representation of a multilevel inverter coupled to a single phase in accordance with an embodiment of the invention.

FIG. 3 is a block diagram representation of one multilevel inverter 22 in accordance with an embodiment of the invention. Each multilevel inverter 22 includes a high frequency inverter 40 coupled to a bridge controller 42 that controls the operations of the high frequency inverter 40. The high frequency inverter 40 receives the portion of input DC power 32 from the generator rectifier 30 and converts the input DC power 32 to a converted AC power 44 based on the control signals 46 provided by the bridge controller 42. The converted AC power 44 is transmitted to a plurality of high frequency transformers 48 that increase a voltage level of the converted AC power 44. Consequently, the converted AC power 44 with the increased voltage level is combined to form the combined AC power 50. The combined AC power 50 is transferred to a grid converter 52 electrically coupled to the plurality of transformers 48. In some embodiments, the grid converter 52 is controlled by a grid controller 54 and receives control signals 56 from the grid controller 54 to generate the output power 34 from the combined AC power 50 and/or to provide power from the power grid to the power source under situations when grid support is required by the power source. In embodiments with both bridge and grid controllers, the bridge controller 42 and the grid controller 54 may be either integral to one unit or may be in separate units. In another embodiment, the bridge controller 42 and the grid controller 54 may be integral to the high frequency inverter 40 or to the grid converter 52 respectively.

Figure 4:
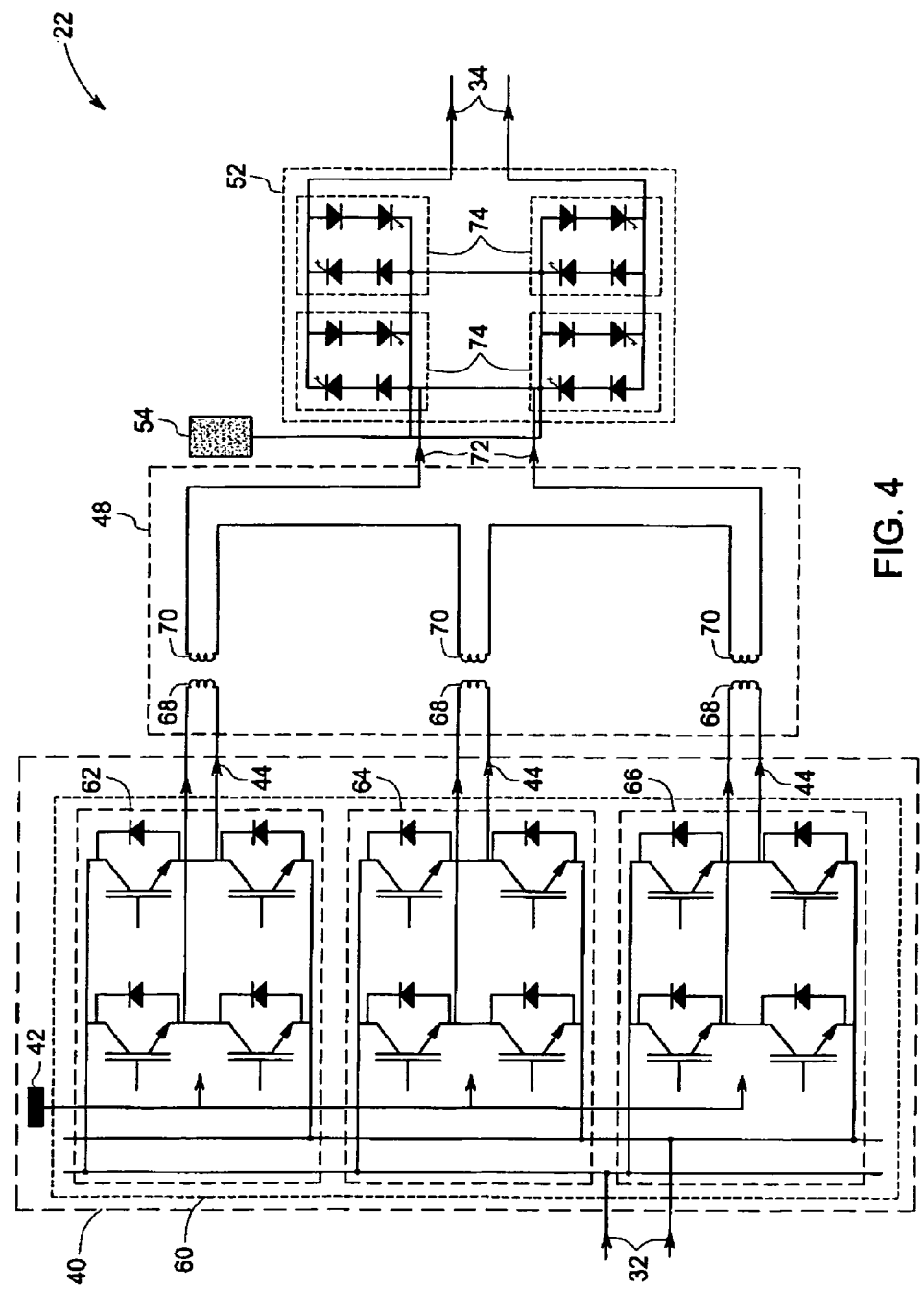
FIG. 4 is a detailed schematic representation of a multilevel inverter depicting coupling between the various components of the multilevel inverter in accordance with an embodiment of the invention.

FIG. 4 is a detailed schematic representation of the multilevel inverter 22 depicting coupling between the various components of the multilevel inverter 22 in accordance with an embodiment of the invention. The high frequency inverter 40 includes a plurality of bridges 60 that operate at a high frequency to generate the converted AC power 44 from the input DC power 32. Each of the plurality of bridges 60 receives a respective portion of the input DC power 32 and converts the respective portion of the input DC power 32 to a respective converted AC power 44. The plurality of bridges 60 are coupled to the bridge controller 42 that controls the switching operations of the plurality of bridges 60. In one embodiment, the plurality of bridges 60 includes a first bridge 62, a second bridge 64 and a third bridge 66. Although three bridges are shown, the invention is not restricted to three bridge embodiments. Fewer or more bridges may be used to achieve desired resolution.

Bridge controller 42 provides control signals 46 (FIG. 3) to operate at least one of the plurality of bridges in a square waveform mode. In a more specific embodiment, the bridge controller 42 provides control signals to operate at least one of the bridges at least partially in a duty cycle mode and to operate at least some of the remaining bridges in square waveform modes. In another embodiment, the bridge controller provides control signals to operate one of the bridges at least partially in a duty cycle mode and to operate the remaining bridges entirely in square waveform modes. In some embodiments where less resolution is required, the bridge controller may provide control signals to operate all of the bridges entirely in square waveform mode. The plurality of bridges 60 operate simultaneously to generate either in-phase or out-of-phase portions of the converted AC power 44. The phase of the respective portions of the converted AC power 44 depends on the point-of-waveform to be generated such that polarities of the respective portions of the converted AC power 44 are additive or subtractive resulting in a net output voltage closely resembling a sinusoidal reference voltage.

The respective converted portions of the AC power 44 are transferred to the respective transformers 48 electrically coupled to the respective bridges 60. Each of the plurality of transformers 48 includes a primary winding 68 electrically coupled to the respective bridge 60 and a secondary winding 70 paired with the primary winding 68 and electrically coupled in series with the other secondary windings. In one embodiment, the plurality of transformers 48 include at least one transformer 48 having a different turn ratio of the primary winding 68 and the respective secondary winding 70 than another transformer 48. In this embodiment, each of the plurality of transformers 48 increases the voltage level of the respective portion of the converted AC power 44 based on its respective turn ratio. In one embodiment, different turn ratios are preset to generate a desired multilevel net output voltage. The respective portions of the converted AC power 44 at each of the secondary windings 70 are added to form a combined AC power 72. The magnitude of the combined AC power 72 represents the sinusoidal reference voltage.

The combined AC power 72 is transferred to the grid converter 52 electrically coupled to the series coupled secondary windings 70. The grid converter 52 may be coupled to a grid controller 54 that controls the grid converter 52 to generate the output power 34 for the power grid 36. The output power 34 may include either DC output power or AC output power. As illustrated, the grid converter 52 includes a plurality of diodes and switches 74 electrically coupled to each other.

In embodiments, wherein DC output power 34 is generated, the grid converter 52 need not comprise any controllable devices. In such embodiments, the grid converter 52 may include a diode bridge to rectify the combined AC power 72 to generate the DC output power 34. If desired for additional flexibility, however, controllable devices such as silicon controlled rectifiers or gate turn-off thyristors will be useful to allow for bi-directional power flow which is useful in circumstances where power is down for a wind turbine, for example, and supply of power from the power grid 36 to the wind turbine 10 would enable wind turbine 10 starting up without the need for on-tower 14 energy storage.

In embodiments wherein AC output power 34 is generated, controllable devices will be included. In such embodiments, the grid converter 52 operates as an AC to −AC converter and converts the combined AC power 72 to the AC output power in a sinusoidal waveform having a frequency level (typically a lower frequency level) compatible for transmission in the power grid 36 (FIG. 2).

Figure 5:
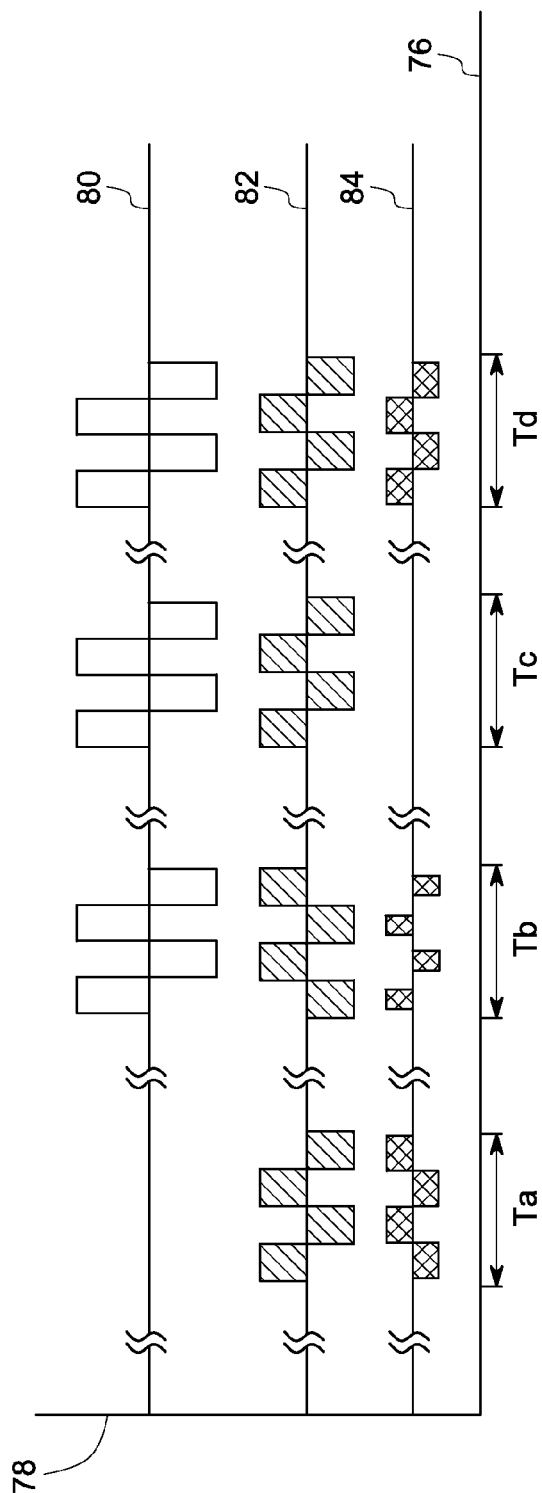
FIG. 5 is an exemplary graphical representation of various portions of converted AC power with an increased voltage in a square waveform mode at an output of the respective secondary windings generated by a plurality of bridges in a multilevel inverter in accordance with an embodiment of the invention.

FIG. 5 is an exemplary graphical representation of various portions of the converted AC power with an increased voltage in a square waveform mode at the output of at least some of the respective secondary windings 70 in accordance with an embodiment of the invention. The X-axis 76 depicts the time, and the Y-axis 78 depicts the voltage. The voltage levels of the different waveforms 80 (highest), 82 (middle), and 84 (lowest) are controlled by respective transformer turn ratios in one embodiment. In accordance with an embodiment of the invention, voltages 80 and 82 have substantially square waveforms, while waveform 84 is duty cycle modulated. The time line break symbols are used so that the scale of the concept is more readily viewable. In practice, there will likely be more cycles than are shown in FIGS. 5 and 6.

As illustrated, for example, during time interval Ta, the first bridge 62 is controlled to provide a zero voltage, while the second bridge 64 and the third bridge 66 are controlled such that they are out of phase. During time interval Tb, bridges 62 and 64 generate square waveforms 80 and 82, which are in oppostion, while bridge 66 is duty cycle modulated to generate waveform 84. During time interval Tc, bridges 62 and 64 generate square waveforms in phase, while bridge 66 is controlled to provide a zero voltage. During time interval Td, all three bridges generate square waveforms in phase. The above-mentioned description is for ninety degrees of the sinusoidal waveform and may be expanded to cover all 360 degrees of the waveform and may then be repeated for generating the combined AC power 72 as described below.

Figure 6:
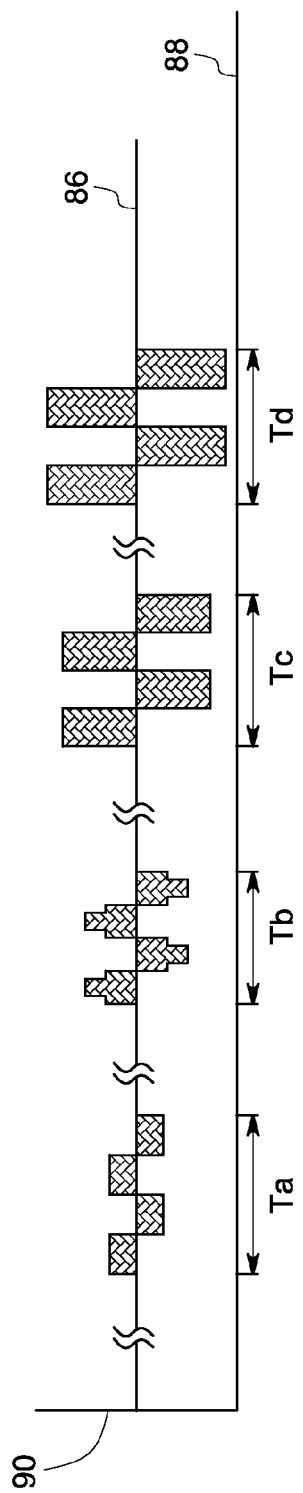
FIG. 6 is an exemplary graphical representation of a combined converted AC power in a square waveform mode generated by a plurality of bridges in a multilevel inverter in accordance with an embodiment of the invention.
Figure 7:
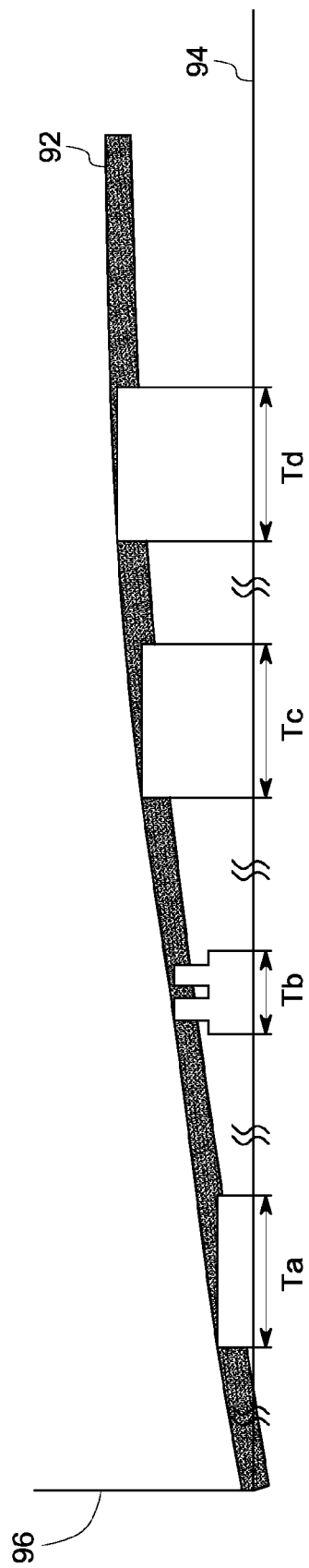
FIG. 7 is an exemplary graphical representation of a sinusoidal waveform generated by a grid converter from a square waveform mode in accordance with an embodiment of the invention.

FIG. 6 is an exemplary graphical representation of the net voltage 86 at the secondary windings 70 of the plurality of transformers 48 resulting from the addition of waveforms 80, 82 and 84 indicated in FIG. 5. The X-axis 88 depicts the time, and the Y-axis 90 depicts the voltage. As observed, for example, the combined AC power 72 is the addition of the voltages at the various points in time. For example, in time interval Ta, no voltage is generated by the highest voltage bridge 62, and the middle voltage bridge 64 has its voltages reduced at the output by the fact that the lowest voltage bridge 66 is being switched out of phase; and, in the second interval Tb, the highest voltage bridge 62 is generating voltage, the middle voltage bridge 64 is operating in an out-of-phase mode to reduce the total magnitude of output voltage, and the lowest voltage bridge 66 is operating in a duty cycle type of mode that is in phase with bridge 62 to more narrowly increase the amount of voltage FIG. 7 is an exemplary graphical representation of a substantially sinusoidal voltage waveform 92 generated by the grid converter 52 from the combined AC power 72 in accordance with an embodiment of the invention. The X-axis 94 depicts the time, and the Y-axis 96 depicts the voltage. The grid converter 52 rectifies the high frequency net voltage waveform 86 and provides a voltage with substantially sinusoidal waveform 92 with desired polarity at the power grid 36 coupling point.

Figure 8:
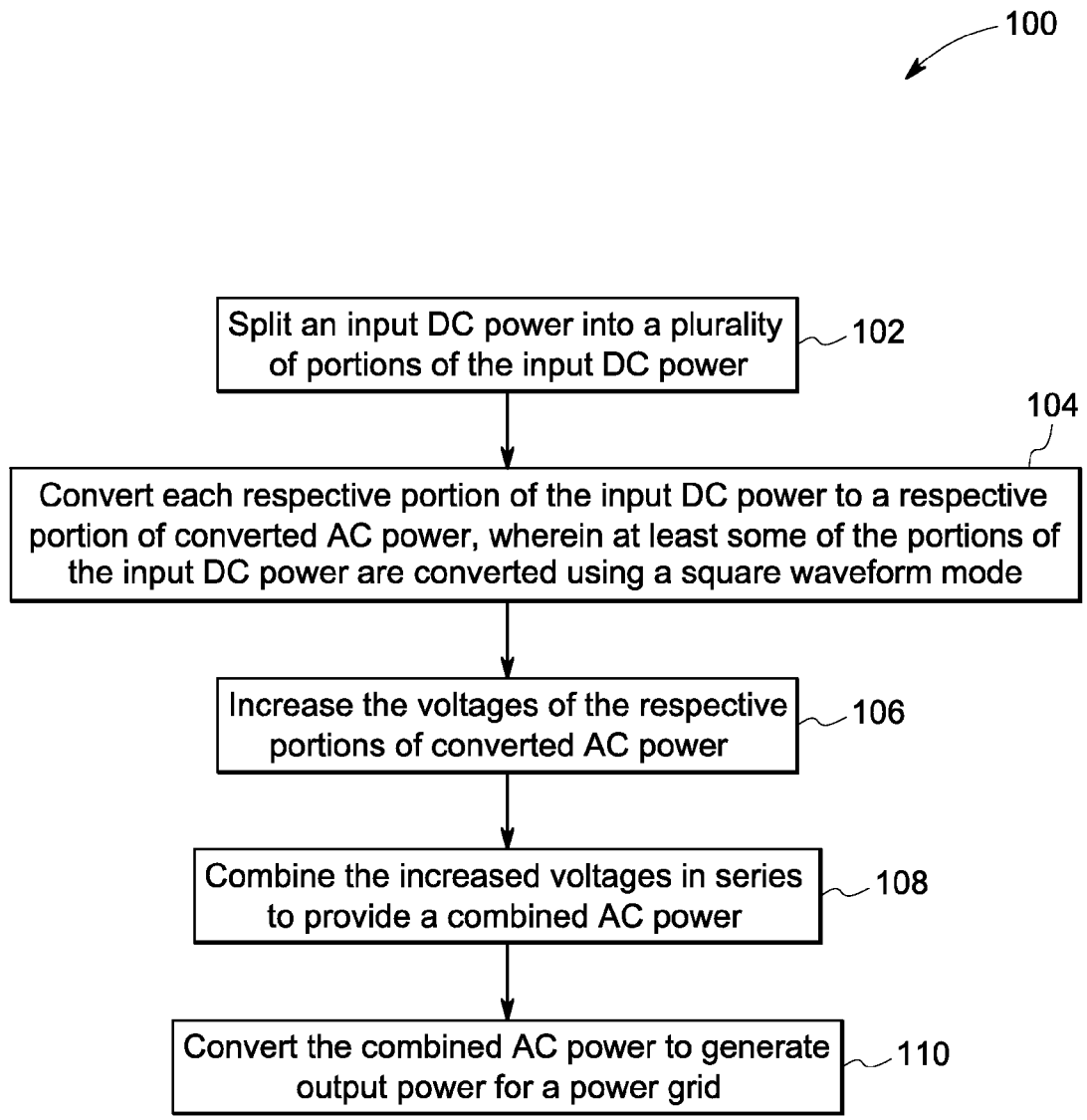
FIG. 8 is a flow chart representing the steps involved in a method for power conversion in accordance with an embodiment of the invention.

FIG. 8 is a flow chart representing the steps involved in a method 100 for power conversion in accordance with an embodiment of the invention. The method 100 includes, for embodiments with rotors, converting mechanical energy received from a rotor to source power. The source power is converted to an input DC power. The input DC power is split into a plurality of portions in step 102. Each of the respective portions of the input DC power is converted to a respective portion of converted AC power wherein at least some of the portions of the input DC power are converted using a square wave form in step 104. In one embodiment, the plurality of bridges are switched at frequencies at or above a few kilohertz to convert the portion of the input DC power to the portion of converted AC power. The voltage of the respective portion of the converted AC power is increased in step 106. In a particular embodiment, the voltages of the respective portions of the converted AC power are increased at different levels. In another embodiment, the voltages are increased at different levels using a plurality of transformers with at least one of the transformers having a different turn ratios than others of the plurality of transformers. The increased voltage converted AC power is combined in series to provide a combined AC power in step 108. The combined AC power is converted to provide output power for a power grid in step 110. In one embodiment, the combined AC power is converted to a DC output power. In another embodiment, the combined AC power is converted to an AC output power.

The various embodiments of the power conversion system described above enable reduction in weight and size of the power conversion system. The reduction leads to a compact size of the power conversion system that can be disposed within the nacelle resulting in easy maintenance and less expensive system costs. Also, the power conversion system does not require large filters and this significantly increases the efficiency and reduces cost and size of the power conversion system. Furthermore, high voltage cables can be employed to transfer the output power from the power conversion system to the grid. In addition, in embodiments wherein the power conversion system generates DC output power that can be directly transferred from the power conversion system to long distance power transmission systems, an additional offshore AC to DC converter is not required.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multilevel inverter comprising;
   a plurality of bridges, each bridge configured to receive a respective portion of an input DC power and convert the respective portion of the input DC power to a respective portion of converted AC power;
   at least one bridge controller for operating at least one of the plurality of bridges in a square waveform mode;
   a plurality of transformers, each transformer coupled to one of the respective bridge and configured to increase a voltage level of the respective portion of converted AC power of the respective bridge, wherein each of the plurality of transformers comprises a primary winding coupled to the respective bridge and a secondary winding paired with the primary winding and coupled in series with the other secondary windings to combine the respective increased voltage level portions of the converted AC power;
   a grid converter electrically coupled to the series connected secondary windings of the plurality of transformers and configured to provide output power for a power grid; and
   a grid controller configured to control operation of the grid converter, wherein the grid converter comprises an AC to AC converter and the grid controller is configured for providing control signals to control the frequency of the output power.

2. The multilevel inverter of claim 1, wherein the bridge controller is configured to provide control signals to operate at least one of the bridges at least partially in a duty cycle mode and to operate at least some of the remaining bridges in square waveform modes.

3. The multilevel inverter of claim 1, wherein the bridge controller is configured to provide control signals to operate one of the bridges at least partially in a duty cycle mode and to operate the remaining bridges entirely in square waveform modes.

4. The multilevel inverter of claim 1, wherein the bridge controller is configured to provide control signals to operate all of the bridges entirely in square waveform modes.

5. The multilevel inverter of claim 1, wherein the grid converter comprises a plurality of diodes and a plurality of semiconductor switches.

6. The multilevel inverter of claim 1, wherein at least one of the plurality of transformers comprises a different turns ratio of the primary winding and the respective secondary winding than another of the plurality of transformers.

7. The multilevel inverter of claim 6, wherein the different turns ratio generates a multilevel net output voltage.

8. A multilevel inverter comprising;
   a plurality of bridges, each bridge configured to receive a respective portion of an input DC power and convert the respective portion of the input DC power to a respective portion of converted AC power;
   at least one bridge controller for operating at least one of the plurality of bridges in a square waveform mode;
   a plurality of transformers, each transformer coupled to one of the respective bridge and configured to increase a voltage level of the respective portion of converted AC power of the respective bridge, wherein each of the plurality of transformers comprises a primary winding coupled to the respective bridge and a secondary winding paired with the primary winding and coupled in series with the other secondary windings to combine the respective increased voltage level portions of the converted AC power;
   a grid converter electrically coupled to the series connected secondary windings of the plurality of transformers and configured to provide output power for a power grid; and
   a grid controller configured to control operation of the grid converter, wherein the grid converter comprises an AC to DC converter and the grid controller is configured for providing control signals to enable power supply from the power grid to a power source through the multilevel inverter.

9. The multilevel inverter of claim 8, wherein the bridge controller is configured to provide control signals to operate at least one of the bridges at least partially in a duty cycle mode and to operate at least some of the remaining bridges in square waveform modes.

10. The multilevel inverter of claim 8, wherein the bridge controller is configured to provide control signals to operate one of the bridges at least partially in a duty cycle mode and to operate the remaining bridges entirely in square waveform modes.

11. The multilevel inverter of claim 8, wherein the bridge controller is configured to provide control signals to operate all of the bridges entirely in square waveform modes.

12. The multilevel inverter of claim 8, wherein the grid converter comprises a plurality of diodes.

13. The multilevel inverter of claim 8, wherein the grid converter comprises a plurality of diodes and a plurality of semiconductor switches.

14. The multilevel inverter of claim 8, wherein at least one of the plurality of transformers comprises a different turns ratio of the primary winding and the respective secondary winding than another of the plurality of transformers.

15. The multilevel inverter of claim 14, wherein the different turns ratio generates a multilevel net output voltage.

* * * * *